(12) United States Patent
Oshima

(10) Patent No.: US 6,880,537 B2
(45) Date of Patent: Apr. 19, 2005

(54) CONTROL UNIT OF INTERNAL COMBUSTION ENGINE

(75) Inventor: Tomomi Oshima, Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/922,967

(22) Filed: Aug. 23, 2004

(65) Prior Publication Data

US 2005/0045162 A1 Mar. 3, 2005

(30) Foreign Application Priority Data

Aug. 25, 2003 (JP) .................................... 2003-299468

(51) Int. Cl.[7] .............................................. F02M 25/07
(52) U.S. Cl. .................................................. 123/568.21
(58) Field of Search .............. 123/568.21, 568.22–568.29, 123/332, 333; 701/104, 108

(56) References Cited

U.S. PATENT DOCUMENTS

| 5,445,125 | A | * | 8/1995 | Allen ........................... 123/399 |
| 5,508,926 | A | * | 4/1996 | Wade ........................... 701/29 |
| 6,017,290 | A | * | 1/2000 | Kinoshita et al. ............ 477/108 |
| 6,182,636 | B1 | * | 2/2001 | Russell et al. ............... 123/399 |

FOREIGN PATENT DOCUMENTS

JP          3316867          6/2002

* cited by examiner

Primary Examiner—Carl S. Miller
Assistant Examiner—Arnold Castro
(74) Attorney, Agent, or Firm—Nixon & Vanderhye P.C.

(57) ABSTRACT

In the control unit of internal combustion engine, in which the exhaust gas recirculation (EGR) quantity to an intake pipe is adjusted by the EGR valve, an EGR regulator controls an opening degree of the EGR valve according to the fuel injection value. And the EGR regulator decreases the opening degree of the EGR valve quickly to the minimum when the increase of the fuel injection valve in a unit time exceeds a criterial value. Further, an EGR buffer prevents the EGR regulator from quick-decreasing the opening degree of the EGR valve when the fuel injection value is wiggling by the operation of the cruise controller.

4 Claims, 4 Drawing Sheets

CONTROL UNIT OF INTERNAL COMBUSTION ENGINE

CROSS REFERENCE TO RELATED APPLICATIONS

This application is based upon and claims the benefit of priority of Japanese Patent Application No. 2003-299468 filed on Aug. 25, 2003, the contents of which are incorporated herein by reference.

FIELD OF THE INVENTION

The present invention relates to a control unit of internal combustion engine, in particular, which controls the EGR (Exhaust Gas Recirculation) valve for returning the exhaust gas to an intake system of the engine.

BACKGROUND OF THE INVENTION

It is known that a internal combustion engine with the exhaust gas recirculation means, which intakes a part of the exhaust gas with the fresh air so as to lower the combustion temperature of the engine for reducing NOx (Nitrogen Oxides) in the exhaust gas. This type of internal combustion engine has a recirculation valve in the exhaust gas recirculation pipe, through which the exhaust gas returns to an intake pipe of the engine. This recirculation valve adjusts the recirculation rate of the exhaust gas in the intake gas.

The recirculation quantity of the exhaust gas is adjusted according to the driving condition of the internal combustion engine. That is, the opening degree of the recirculation valve is increased or decreased based on the commanded fuel injection value and the rotational frequency of the engine.

Further, the opening degree of the recirculation valve is decreased quickly to the minimum when the increase in a unit time of the commanded fuel injection value exceeds a given value. The increase of the fuel injection value is interpreted as a request to enlarge the torque, to prevent the smoke exhaustion by the air shortage caused especially by the response delay of the supercharger.

The commanded fuel injection value is ordinary adjusted by the acceleration opening operated by the driver. However, in these days, the fuel injection value is also adjusted by the cruise controller, which controls the driving state to a given regular state, for example, the driving speed to a fixed value, as shown in the Japanese Patent No. 3316867. The cruise control is adopted for the constant traffic flow in an exclusive motorway.

Here the cruise controller controls the fuel injection value according to the feedback of the variation of the inclination of the road surface, which may shorten the life of the recirculation valve, when it moves frequently in some condition of road surface.

SUMMARY OF THE INVENTION

The objective of the present invention is to provide a control unit of internal combustion engine that makes the movement of the EGR valve in an adequate manner.

The present control unit of internal combustion engine is provided with the EGR pipe, through which a part of exhaust gas returns to an intake pipe of the engine, and with the EGR valve in the EGR pipe, which adjusts the recirculation quantity of the exhaust gas in an intake gas. And a cruise controller in the control unit controls the fuel injection value so that the driving state of a vehicle will be a regular state.

Further, an EGR regulator controls the opening degree of the EGR valve according to the fuel injection value, and decreases the opening degree of EGR valve quickly to the minimum when the increase of the fuel injection value in a unit time exceeds a criterial value. Furthermore, an EGR buffer prevents the EGR regulator from quick-decreasing the opening degree of the EGR valve when the fuel injection value is wiggling by the operation of the cruise controller.

The mode of the EGR buffer is, for example, to round a fluctuation of the fuel injection value controlled by the cruise controller.

The EGR buffer may be to make the criterial value higher when the fuel injection value is controlled by the cruise controller.

And the EGR buffer also may be prevents the EGR regulator from quick-decreasing the opening degree of EGR valve during the time the fuel injection value is controlled by the cruise controller.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

An embodiment of the present invention is described with reference to FIGS. 1 to 3.

Figure 1:
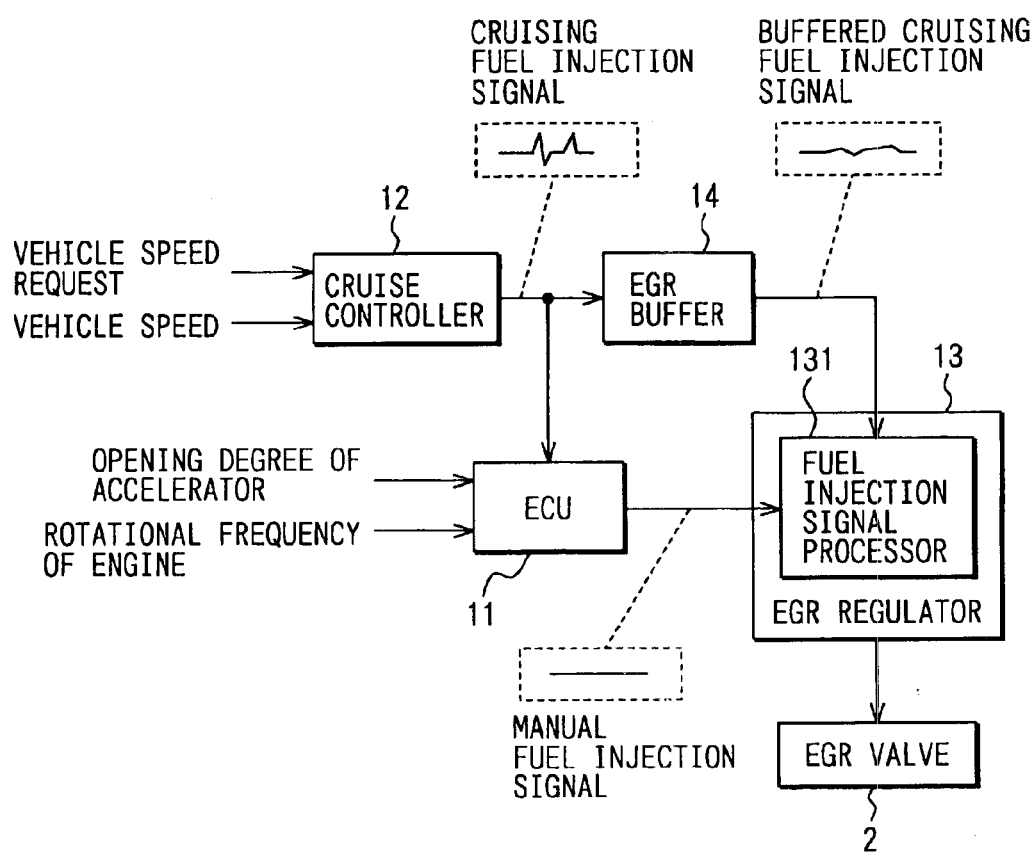
FIG. 1 is a schematic view of an internal combustion engine in accordance with a first embodiment of present invention.

FIG. 1 shows a schematic view of the embodiment of the control unit of internal combustion engine. An operation of the EGR (Exhaust Gas Recirculation) valve is mainly described hereinafter. The control unit of internal combustion engine is provided with an ECU 11 (Electronic Control Unit) for controlling the fuel injection or the ignition, an EGR regulator 13 for controlling the EGR valve, and cruise controller 12 for controlling the fuel injection valve in the cruise control. The ECU 11, the EGR regulator 13, and the cruise controller 12 are comprised of, for example, microcomputers and input/output circuits.

The ECU 11 controls each part of the internal combustion engine, according to the signals from the sensors detecting the conditions of each part of the engine such as the driving state. The fuel injection value, a value for controlling the fuel injector, is determined based on a map to which the opening degree of the accelerator and the rotational frequency of the engine are inputted.

The cruise controller 12 is in operation when a switch provided, for example, on the instrument panel of a vehicle is turned on to the cruise control mode by the driver. The cruise controller 12 outputs the signals requesting the vehicle speed or commanding the fuel injection value. (In the following, the signal commanding the fuel injection value outputted from the cruise controller 12 in operation is called 'cruising fuel injection signal', and that calculated in and outputted from the ECU 11 when the cruise controller 12 is not in operation is called 'manual fuel injection signal'.)

The cruising fuel injection signal is inputted into the ECU 11 as the value for controlling the fuel injector instead of the manual fuel injection signal, when the cruise controller is in operation. This cruise fuel injection signal is set according to the signals requesting the vehicle speed or driving state of the vehicle to be constant.

The EGR regulator 13 adjusts the recirculation quantity of exhaust gas, by controlling EGR valve 2. The EGR valve 2 is provided in the EGR pipe, which returns a part of exhaust gas from the exhaust pipe to the intake pipe of the internal combustion engine.

Figure 2:
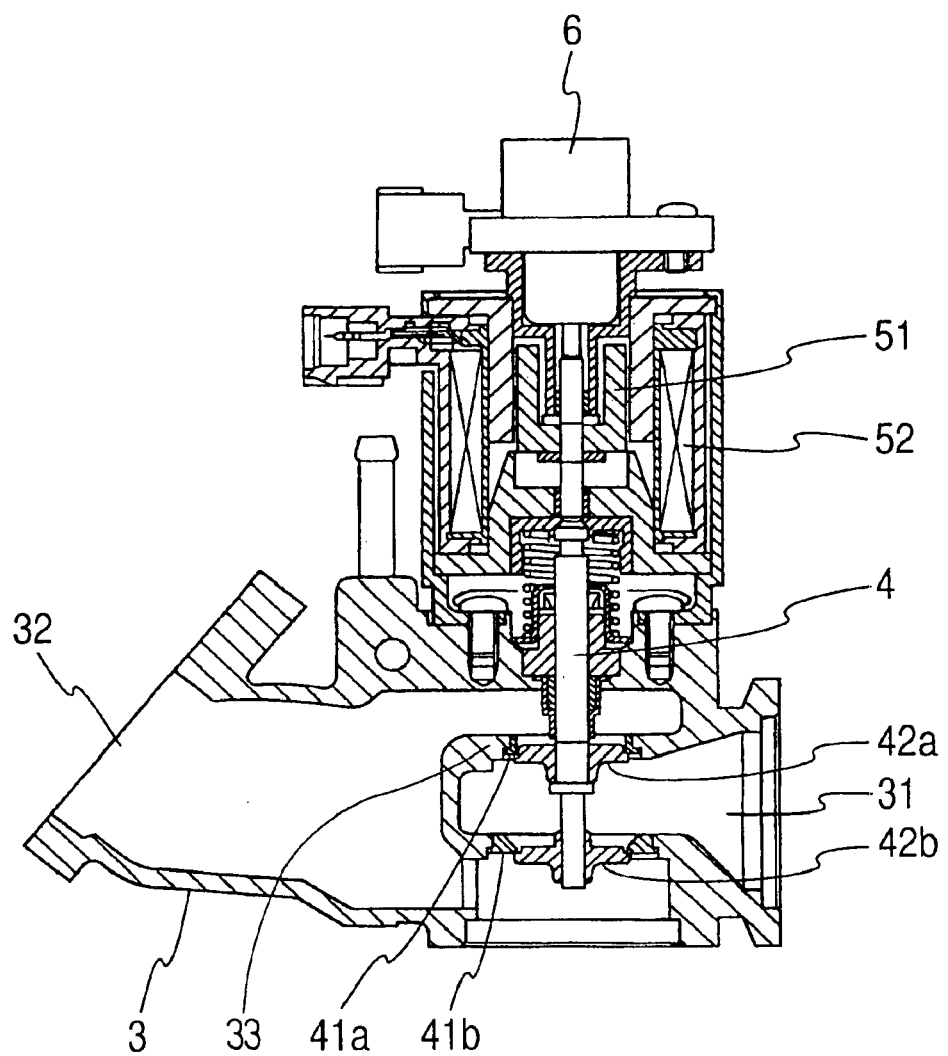
FIG. 2 is a sectional view of an EGR valve in the internal combustion engine in according with a first embodiment.

FIG. 2 shows a common shape of the EGR valve 2. The EGR valve 2 has a housing 3, constituting a part of the EGR pipe, has an inlet chamber 31 connected to the exhaust pipe, an outlet chamber 32 connected to the intake pipe, and a diaphragm 33 forming the boundary between the inlet and the outlet chambers 31, 32. The diaphragm 33 is a cylindrical shape so that the inlet chamber 31 projects into the outlet chamber 32. That is, the cylindrical diaphragm 33 and the housing 3 surrounding the diaphragm 33 is disposed as duplicated cylinders. The inside of the cylindrical diaphragm 33 is the inlet chamber 31, and the outside is the outlet chamber 32. The diaphragm 33 has on its circumference a couple of through-holes facing each other, and the rims of which are provided with valve seats 41a, 41b shaped as rings.

On each of valve seats 41a, 41b is shut by each valve heads 42a, 42b shaped as disks, which are held by a valve stem 4 piercing the through-holes. An electromagnetic solenoid 52 give linear motion to an armature 51, which is connected on the valve stem 4 in roughly coaxial alignment, and adjusts the lift height of the valve heads 42a, 42b. A lift sensor 6 is provided at the axial end of the valve stem 4, and detects the lift height of the valve heads 42a, 42b, or the opening degree of the EGR valve 2.

The EGR regulator 13 is provided with some peripheral circuits such as a duty cycle control circuit adjusting the operating electricity inputted into the electromagnetic solenoid 52, in which the duty ratio is set according to target lift height and the lift height signal outputted from the lift sensor 6.

The fuel injection signals are also used for the setting for the duty ratio, that is, for the control of the EGR valve 2. The EGR regulator 13 controls the valve opening degree according to the fuel injection value commanded in the fuel injection signals and the rotational frequency of the engine. And the EGR regulator 13 decreases the opening degree of EGR valve 2 quickly to the minimum, or zero opening, when the increase of the fuel injection value in a unit time exceeds a criteria value.

The increase of the fuel injection value in a unit time is derived by differentiating the fuel injection value by time, that is, by dividing the difference of the fuel injection value in a given time by a given time. In the following, the fuel injection value used for controlling the EGR valve 2 is called as 'fuel injection value for EGR control'.

The fuel injection signal processor 131 in the EGR regulator 13 chooses the fuel injection value between the manual fuel injection signal when the cruise control is not operating and the cruise fuel injection signal when the cruise control is operating. The duty ratio is set in such a manner that the opening degree of the EGR valve 2 quickly decreases to zero opening while the manual fuel injection signal is chosen, that is, the cruise control is not operation.

In the following is described the case in which the duty ratio is set based on the cruising fuel injection value when the cruise control is operating.

The cruising fuel injection value is inputted via the EGR buffer 14 into the fuel injection value processor 131. The EGR buffer 14 rounds the fluctuation of the inputted cruising fuel injection value and outputs the rounded cruising fuel injection value to the fuel injection signal processor 131. This rounding transformation is processed by the means such as moving average or first order IIR (Infinite Impulse Response) filter.

Figure 3:
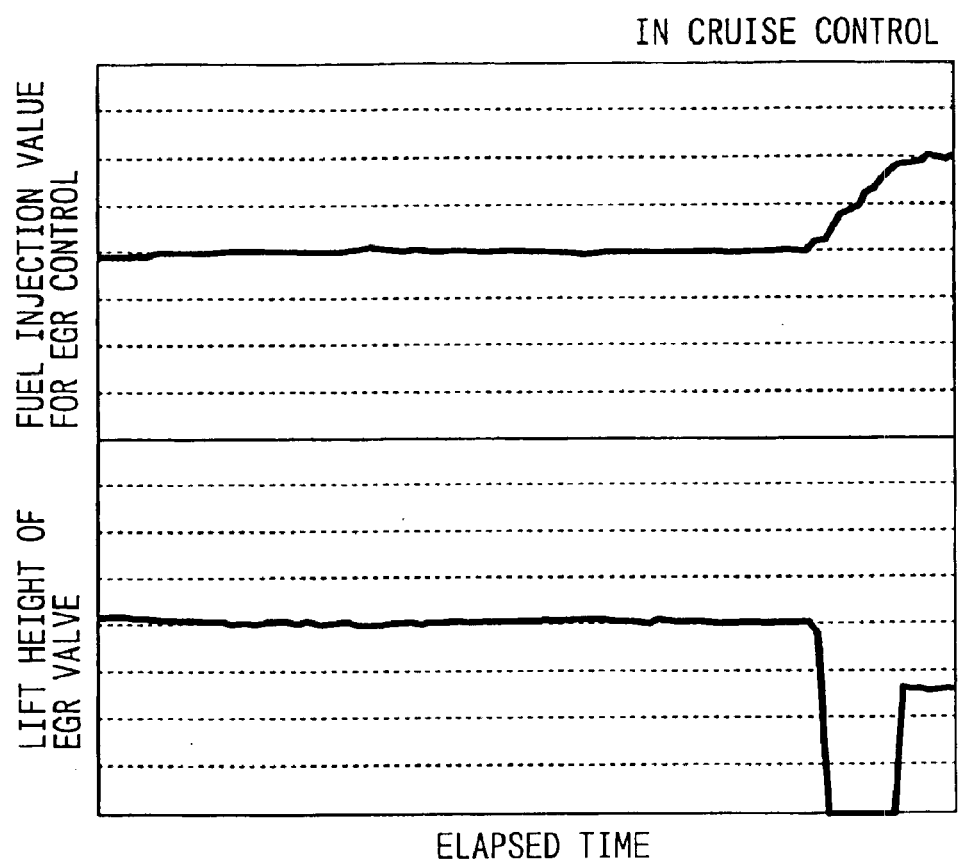
FIG. 3 is a timing chart which shows the operation of a control device for the internal combustion engine in accordance with a first embodiment.
Figure 4:
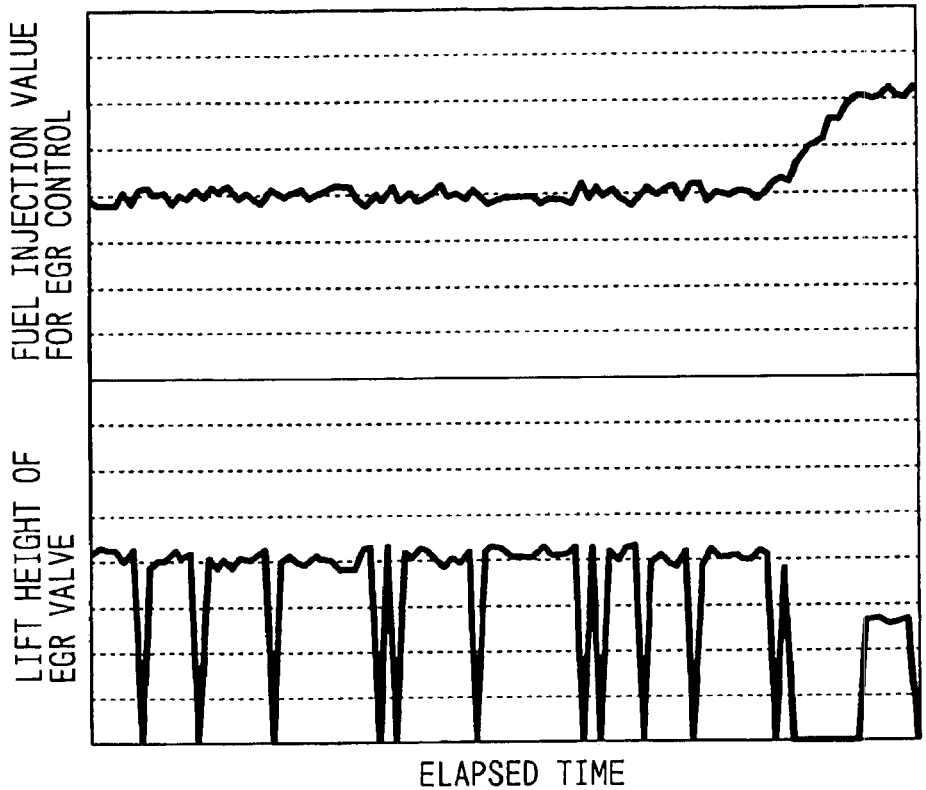
FIG. 4 is a timing chart which shows the operation of a control device for the internal combustion engine in a prior art.

FIG. 3 shows an example of the lift height of the EGR valve 2 subject to the fuel injection value for EGR control by the control unit of internal combustion engine (the present embodiment). FIG. 4 shows a conventional example of the lift height of the EGR valve subject to the fuel injection value for EGR control by the control unit of internal combustion engine without the EGR buffer mentioned above.

In the conventional system, the fuel injection value for EGR control equals to the cruising fuel injection value, which wiggles by the operation of the cruise controller to uniform the fluctuating vehicle speed subject to the road surface condition. And the increase of the fuel injection value in a unit time exceeds a given criterial value frequently, and the EGR valve 2 repeats shutting. In the EGR valve 2, the valve heads 42a, 42b are put onto and lifted from the valve seat 41a, 41b repeatedly, and the wears of the valve seats 41a, 41b and the valve heads 42a, 42b are accelerated. The increase of the fuel injection value in the late time in the FIGS. 3, 4 and 5 (mentioned in the following) shows the state that the vehicle starts acceleration by the driver's accelerating operation.

In the present embodiment, the fuel injection value for EGR control is the rounded cruising fuel injection value so that the high value in the fluctuation of the cruising fuel injection value is removed. And this rounding process prevents the repeated shutting of the EGR valve 2. And the wears of the EGR valve 2, caused by the valve heads 42a, 42b put onto and lifted from the valve seat 41a, 41b repeatedly, are reduced.

When the cruise controller is not operating, the fuel injection value is set according to the acceleration stroke operated by a driver, and the fuel injection value for EGR control also reflects the acceleration stroke. Thus, when the torque demand increases in a short time by driver's intention to accelerate the vehicle suddenly, the EGR valve 2 is quickly shut, so that the air shortage and the smoke exhaustion caused by the response delay of the supercharger is prevented.

Figure 5:
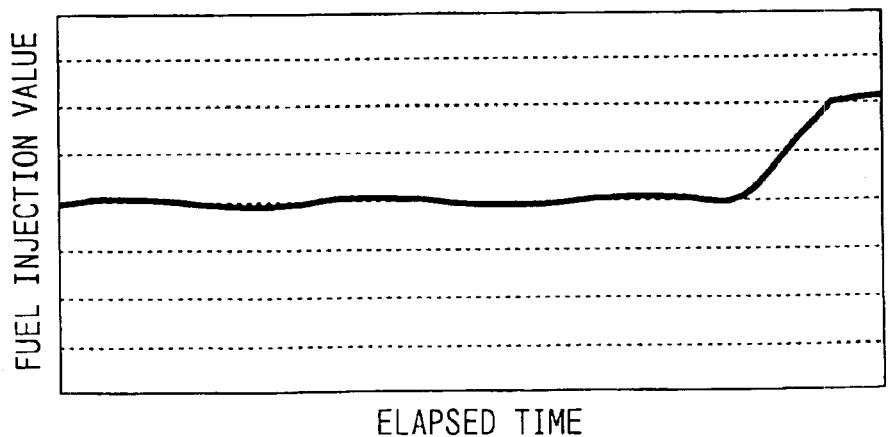
FIG. 5 is a timing chart which shows the commanded fuel injection value when the accelerator is operated by a driver intending the uniform vehicle speed.

FIG. 5 shows an example of the fuel injection value by the acceleration stroke operated by a driver intending a constant vehicle speed. The driver do not change the acceleration stroke corresponding to the slight fluctuation of the vehicle speed, and the fuel injection value moves gently as shown in FIG. 5, in this kind of state the EGR valve 2 is not shut by the EGR regulator 13. The fuel injection value for EGR control moves similarly to the fuel injection value by the acceleration stroke operated by a driver intending a constant vehicle speed, so that the EGR valve 2 does not shut in vain.

The embodiment mentioned above shows an example that the fuel injection value for EGR control is a cruising fuel injection value rounded by EGR buffer.

However, the EGR buffer may adopt means other than rounding processing. The EGR buffer may be to choose the criterial value compared with the fuel injection value for EGR control between the criterial value when the cruise control is not operating (called as 'first criterial value' in the following) and another criterial value higher than the first criterial value (called as 'second criterial value' in the following). The decision whether to shut the EGR valve 2 or not is subject to the second criterial value when the cruise control is operating. The second criterial value higher than the first criterial value makes the frequency of EGR valve motion more adequate.

The EGR buffer also may be to prevent the EGR regulator from quick-decreasing the opening degree of the EGR valve during cruise control operation. This means is equivalent to the means mentioned above when the second criterial value is set to plus infinite.

What is claimed is:

1. A control unit of internal combustion engine, provided with exhaust gas recirculation pipe, through which a part of exhaust gas returns to an intake pipe of the engine, and with an exhaust gas recirculation valve in the exhaust gas recirculation pipe, which adjusts the recirculation quantity of the exhaust gas in an intake gas, comprising:

a cruise controller which controls the fuel injection value so that the driving state of a vehicle is a regular state;

an exhaust gas recirculation regulator which controls the opening degree of the exhaust gas recirculation valve according to the fuel injection value, and decreases the opening degree of the exhaust gas recirculation valve quickly to the minimum when the increase of the fuel injection value in a unit time exceeds a criterial value; and an exhaust gas recirculation buffer that prevents the exhaust gas recirculation regulator from quick-decreasing the opening degree of the exhaust gas recirculation valve when the fuel injection value is wiggling by the operation of the cruise controller.

2. The control unit of internal combustion engine according to claim 1, wherein the exhaust gas recirculation buffer rounds a fluctuation of the fuel injection value controlled by the cruise controller.

3. The control unit of internal combustion engine according to claim 1, wherein the exhaust gas recirculation buffer make the criterial value higher when the fuel injection value is controlled by the cruise controller.

4. The control unit of internal combustion engine according to claim 1, wherein the exhaust gas recirculation buffer prevents the exhaust gas recirculation regulator from quick-decreasing the opening degree of the exhaust gas recirculation valve during the time the fuel injection value is controlled by the cruise controller.

* * * * *